United States Patent [19]

Tsuzuki et al.

[11] 4,364,513

[45] Dec. 21, 1982

[54] AIR-CONDITIONING CONTROL APPARATUS FOR AUTOMOTIVE VEHICLES

[75] Inventors: Yoshihiko Tsuzuki, Anjo; Yuzi Hirabayashi, Aichi; Shinji Shirasaki; Masahiro Matsuyama, both of Kariya; Hiroshi Okazaki, Okazaki, all of Japan

[73] Assignee: Nippondenso Co., Ltd., Kariya, Japan

[21] Appl. No.: 212,747

[22] Filed: Dec. 3, 1980

[30] Foreign Application Priority Data

Dec. 12, 1979 [JP] Japan .................... 54-162099

[51] Int. Cl.³ ............... F24F 7/00; B60H 1/00
[52] U.S. Cl. .................. 236/49; 62/186; 98/2.01; 165/43
[58] Field of Search ............ 236/49; 62/186; 98/2.01; 165/42, 43

[56] References Cited

U.S. PATENT DOCUMENTS 4,289,195 9/1981 Bellot et al. ............... 165/42 X
4,311,188 1/1982 Kojima et al. ............. 165/43 X Primary Examiner—William E. Wayner
Attorney, Agent, or Firm—Cushman, Darby & Cushman

[57] ABSTRACT

An automobile air-conditioning control apparatus includes a microcomputer which is responsive to the output signals of a compartment temperature sensor for sensing the temperature of the vehicle compartment of an automobile and temperature setting means for setting a desired temperature to be controlled to perform digital computational operations. The position of flow direction changing plate means and the rotational speed of blower motors are automatically controlled in accordance with the command signals from the microcomputer.

4 Claims, 8 Drawing Figures

AIR-CONDITIONING CONTROL APPARATUS FOR AUTOMOTIVE VEHICLES

BACKGROUND OF THE INVENTION

The present invention relates to an air-conditioning control apparatus for automobiles which is designed so that the direction of flow fo the temperature-adjusted air into the vehicle compartment of an automobile is changed to control the air-conditioning of the vehicle compartment.

In the past, it has been the practice that when quick cooling is desired as when the temperature of the vehicle compartment of an automobile is high, the occupants of the automobile personally control and shift the air outlets provided on the center, left and right sides of the compartment so that the cooled air is blown toward the occupants, and after the compartment temperature has decreased gradually the center, left and right air outlets are again controlled and shifted suitably to air-condition the entire compartment.

Such manual operation is disadvantageous in that since the center, left and right air outlets are shifted only when the occupants feel cold or hot, a considerable time is required for the occupants to attain a stable air-conditioned state and it is necessary to frequently shaft the air outlets for this purpose.

SUMMARY OF THE PRESENT INVENTION

With a view to overcoming the foregoing deficiencies in the prior art, it is the object of the present invention to provide, in an air-conditioning control apparatus for automobiles comprising a compartment temperature sensor for sensing the temperature of the compartment of an automobile, means for supplying temperature adjusted air to the compartment to adjust the compartment temperature sensed by the temperature sensor to a desired value for compartment air-conditioning and shifting means for changing the direction of flow of the temperature-adjusted air into the compartment to thereby control the air-conditioning of the compartment. The improvement includes actuating means for actuating the shifting means to effect the selection between a partial blowing for blowing the temperature-adjusted air toward the object occupants and an overall blowing for blowing the air over all the compartment, and control means whereby when the compartment temperature sensed by the temperature sensor is out of a stable air-conditioning temperature range the actuating means is controlled so as to blow the temperature-adjusted air by the partial blowing, thereby suitably changing through automatic control the manner of blowing the temperature adjusted-air during the transition period in the air-conditioning of the compartment.

BRIEF DESCRIPTION OF THE DRAWINGS

The above and other objects of the invention will become readily apparent from the following detailed description taken in conjunction with the accompanying drawings, in which.

DESCRIPTION OF THE PREFERRED EMBODIMENT

The present invention will now be described in greater detail with reference to the illustrated embodiment.

Figure 1:
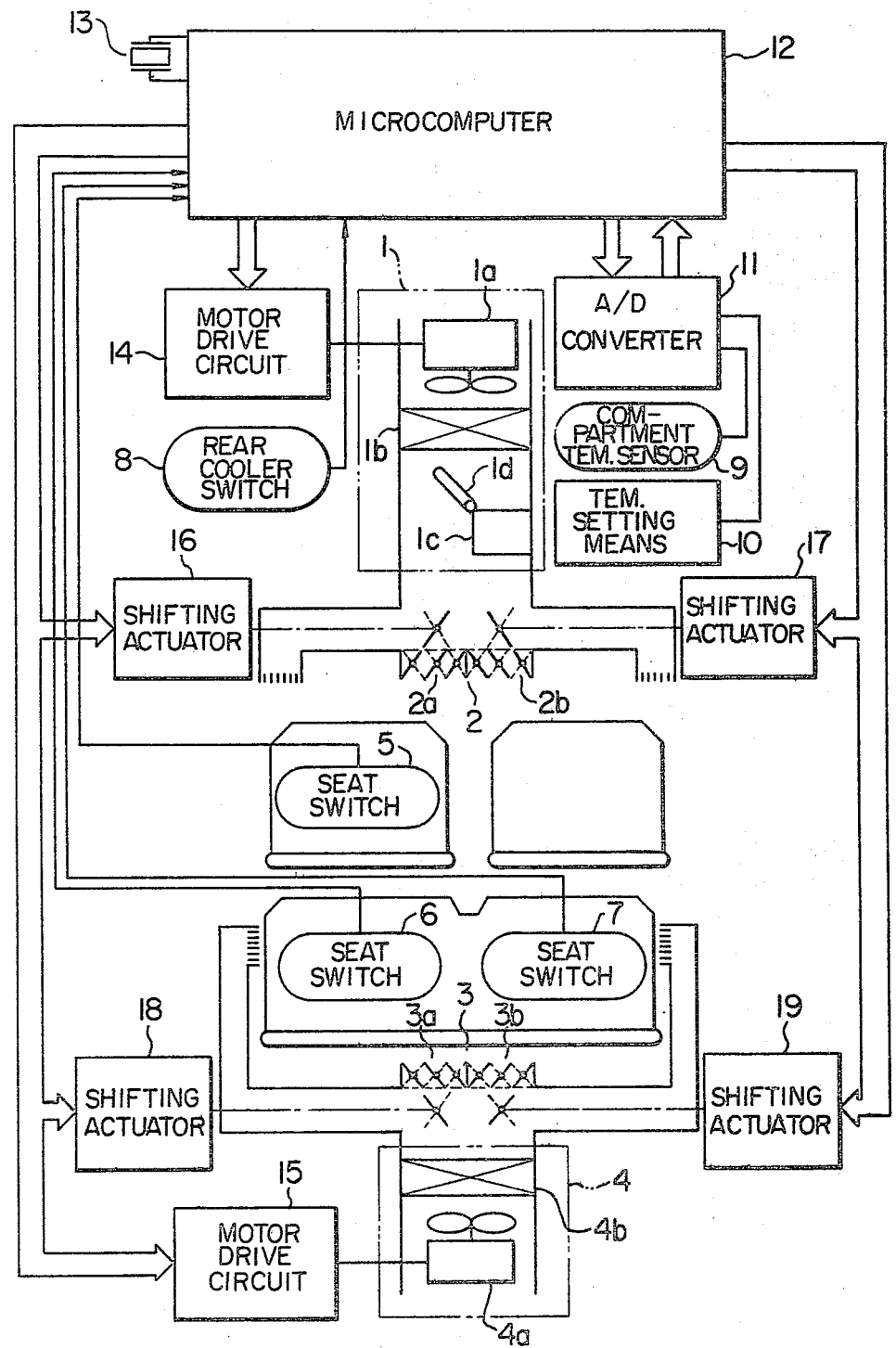
FIG. 1 is a schematic block diagram showing the overall construction of an embodiment of the present invention.

Referring to FIG. 1 showing the overall construction of an embodiment of the invention, it uses a vehicle-mounted microcomputer designed to perform the digital computational operations of software in accordance with a predetermined control program.

In the Figure, numeral 1 designates an air conditioner system comprising a blower motor 1a for blowing the air from an inner/outer air selector damper (not shown), an evaporator 1b for cooling and passing therethrough the air blown by the blower motor 1b, a heater core 1c for introducing the engine cooling water to use its heat to heat and pass the blown air therethrough, and an air mixing damper 1d for adjusting the proportion of the air passed through the evaporator 1b and introduced into the heater core 1c and thereby adjusting the air temperature. Numeral 2 designates a front center air outlet including flow direction changing plate groups 2a and 2b so as to shift the direction of the air blown into the front part of the vehicle compartment. Numeral 3 designates a rear center air outlet including flow direction changing plate groups 3a and 3b so as to shift the direction of the air blown into the rear part of the compartment. Shifting means is formed by the flow direction changing plate groups 2a, 2b, 3a and 3b of the front and rear center air outlets 2 and 3. Numeral 4 designates a rear cooler unit comprising a blower motor 4a and an evaporator 4b. Numerals 5, 6 and 7 designate seat switches respectively designed to close and generate a seat signal when the occupant sits in the assistant driver's seat, the rear left seat and the rear right seat, respectively. Numeral 8 designates a rear cooler switch which is closed to actuate the rear cooler and generate a rear cooler signal. Numeral 10 designates temperature setting means for establishing a desired temperature to be controlled, which is manually operable by the occupant to establish any desired temperature. Numeral 9 designates a compartment temperature sensor provided on the instrument panel in the compartment to sense the temperature inside the compartment. Numeral 11 designates an A/D converter for converting an analog signal to a digital signal, whereby the compartment temperature signal from the compartment temperature sensor 9 and the preset temperature signal from the temperature setting means 10 are sequentially converted to digital signals.

Numeral 12 designates a microcomputer designed to perform digital computational operations of software in accordance with a predetermined control program and forming control means. The microcomputer 12 is connected to a quartz crystal unit 13 of several MHz and it comes into operation when supplied with the stabilized voltage from a stabilized power supply circuit (not shown) which is supplied by the vehicle battery to generate a 5-volt stabilized voltage. The microcomputer 12 comprises, as its principal parts, a read-only memory (ROM) storing a control program which determines the sequence of operations, a central processing unit for sequentially reading the control program from the ROM to perform the corresponding computational operations, a memory (RAM) for temporarily storing the various data associated with the operations of the CPU so as to be read by the CPU, a clock generator including the quartz crystal unit 13 for generating the reference clock pulses required for the various operations and an input/output (I/O) circuit section for controlling the transfer of the various signals into and out of the microcomputer 12. The operations performed by the microcomputer 12 result in the generation of various command signals including command signals for controlling the rotational speed of the blower motors 1a and 4a, direction shifting command signals for the flow direction changing plate groups 2a, 2b, 3a and 3b of the front and rear center air outlets 2 and 3, etc.

Numerals 14 and 15 designate motor drive circuits for respectively controlling the rotational speed of the blower motors 1a and 4a, each comprising a latch circuit for latching the digital command signal from the microcomputer 12 which is indicative of a rotational speed, a D/A converter for converting the latched digital signal to an analog signal, an oscillator circuit for generating a triangular wave signal having a fixed frequency and a fixed amplitude, a comparator circuit for comparing the triangular wave signal from the oscillator circuit with the analog signal from the D/A converter to generate a pulse train having a fixed frequency and a duty cycle proportional to the analog signal amplitude and an amplifier for amplifying the pulse train, thus subjecting the current flow to the blower motor to duty cycle control to control its rotational speed. Numerals 16, 17, 18 and 19 designate shifting actuators forming actuating means for shifting the flow direction changing plate groups 2a, 2b, 3a and 3b of the front and rear center air outlets 2 and 3.

Figure 2:
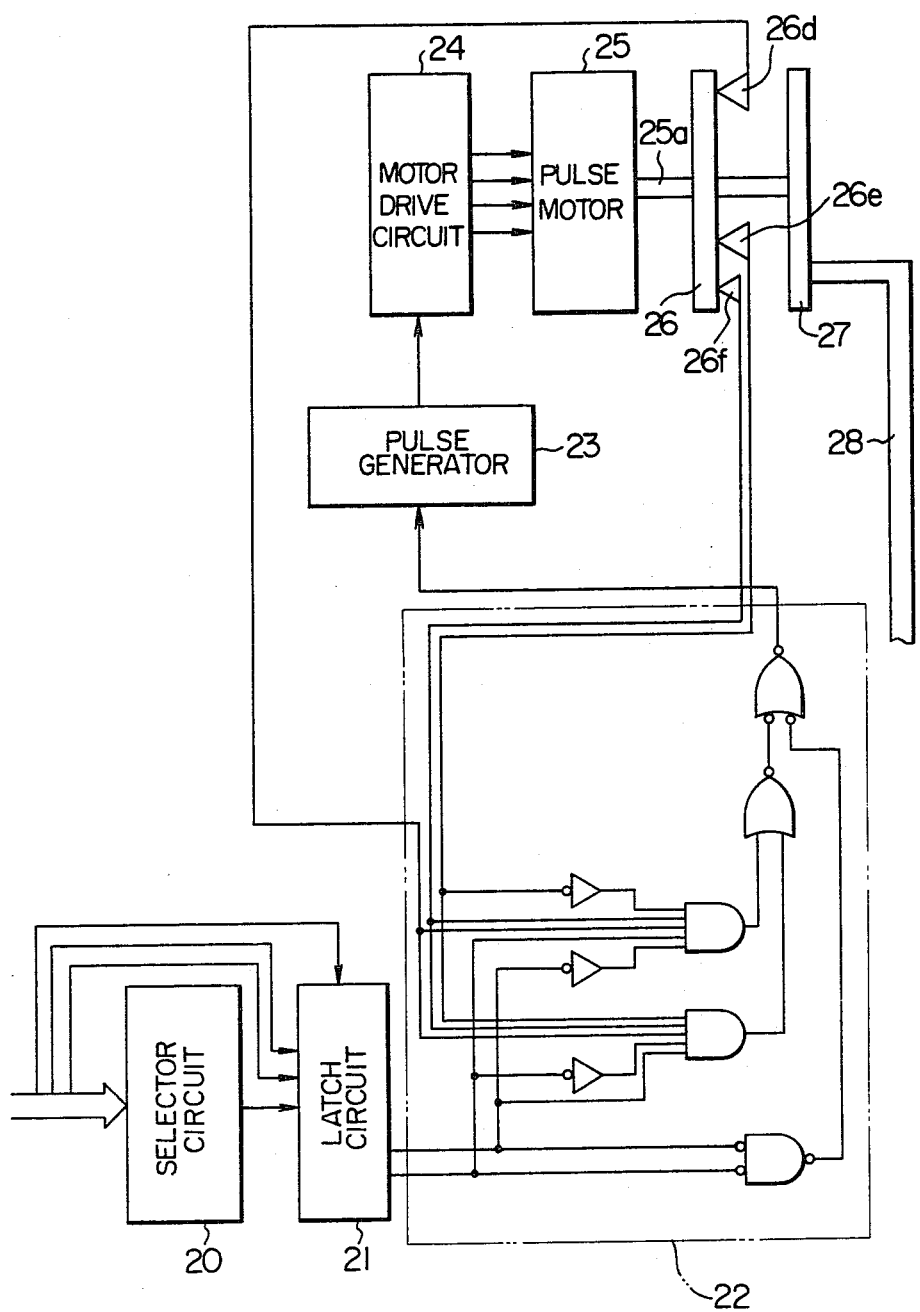
FIG. 2 is a block diagram showing in detail the construction of the shifting actuators shown in FIG. 1.
Figure 3:
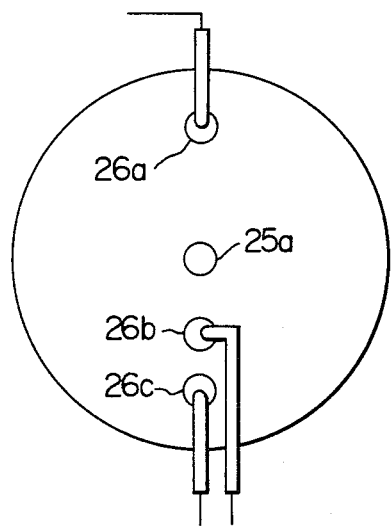
FIG. 3 is a front view of a position sensing board.
Figure 4:
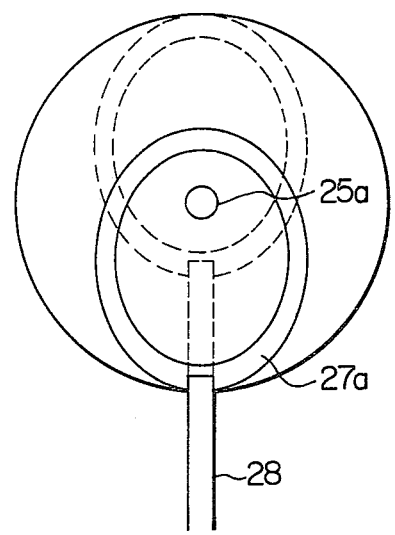
FIG. 4 is a front view of a reciprocating actuation board.

The detailed construction of the shifting actuators 16, 17, 18 and 19 will now be described in reference to the block diagram of FIG. 2. In the Figure, numeral 20 designates a selector circuit for selecting the shifting actuator selection signal from the microcomputer 12 to generate a latch signal. Numeral 21 designates a latch circuit for latching a 2-bit digital signal indicative of a shifting signal in synchronism with the clock signal from the microcomputer 12 when the latch signal is being generated from the selector circuit 20. Numeral 22 designates a logical operation circuit responsive to the 2-bit signal latched by the latch circuit 21 and a 3-bit signal indicative of a position of the flow direction changing plate group to generate through various logical computing elements a control signal for shifting the flow direction changing plate group. Numeral 23 designates a pulse generator for generating a pulse train of a predetermined period when the control signal from the logical operation circuit 22 is at a high level. Numeral 24 designates a motor drive circuit responsive to the pulse train from the pulse generator 23 to generate four-phase drive pulses. Numeral 25 designates a pulse motor responsive to the drive pulses from the motor drive circuit 24 to rotate a rotary shaft 25a. Numeral 26 designates a position sensing board adapted to be rotated in response to the rotation of the rotary shaft 25a and comprising, as shown in FIG. 3, copper foils 26a, 26b and 26c formed on the board such that a high level signal is applied to the logical operation circuit 22 when contacts 26d, 26e and 26f respectively coincide with the copper foils 26a, 26b and 26c, respectively. The copper foils 26a and 26c are arranged in the 180-degree symmetrical positions with respect to the rotary shaft 25a. Numeral 27 designates a reciprocating actuation board adapted to be rotated by the rotation of the rotary shaft 25a and including an actuation shaft 28 for shifting the flow direction changing plates and an oval groove 27a formed in the board and having the forward end of the shaft 28 fitted therein as shown in FIG. 4, thus reciprocating the actuation shaft 28 in response to the rotation of the rotary shaft 25a.

More specifically, if the signal states of the logical operation circuit 22 are such that the high level signal is represented by "1" and the low level signal is represented by "0", when the 2-bit signal generated from the microcomputer 12 and latched by the latch circuit 21 is (1, 1), the output of the logical operation circuit 22 goes to "1" so that the pulse generator 23 continuously generates pulses and the pulse motor 25 is operated through the motor drive circuit 24, thus reciprocating the actuation shaft 28. As a result, the flow direction changing plate group is caused to make oscillatory motion. On the other hand, when the signal from the latch circuit 21 is (0, 0), the output of the logical operation circuit 22 goes to "0" so that the pulse generator 23 generates no pulses and the actuation shaft 28 is held in the position where it is. When the signal from the latch circuit 21 is (0, 1) or (1, 0), the output of the logical operation circuit 22 remains at "1" until the signals from the contacts 26d, 26e and 26f of the position sensing board 26 become (1, 0, 1) or (1, 1, 1), thus moving the actuation shaft 28 to hold the flow direction changing plate group in the left or right position.

Next, with the construction described above, the operation of the embodiment will be described with reference to the flowcharts shown in FIGS. 5 to 8.

Figure 5:
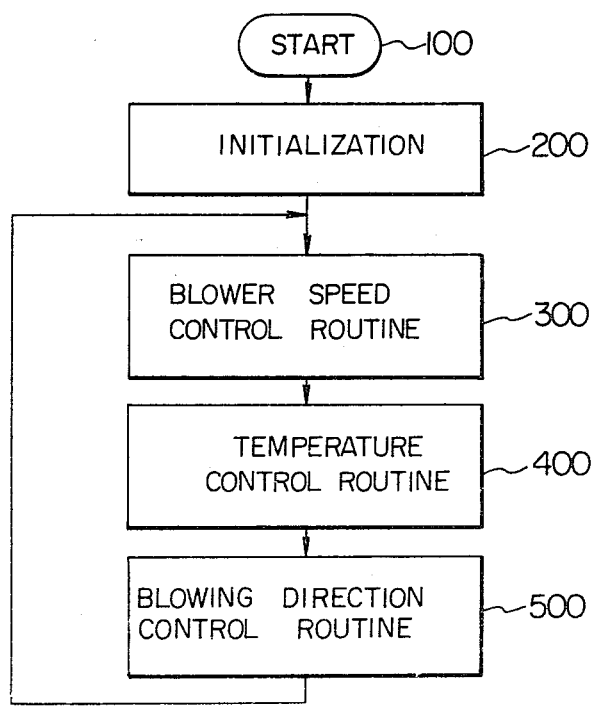
FIG. 5 is a flowchart showing the overall processing operation performed by the microcomputer of FIG. 1 in accordance with a control program.
Figure 6:
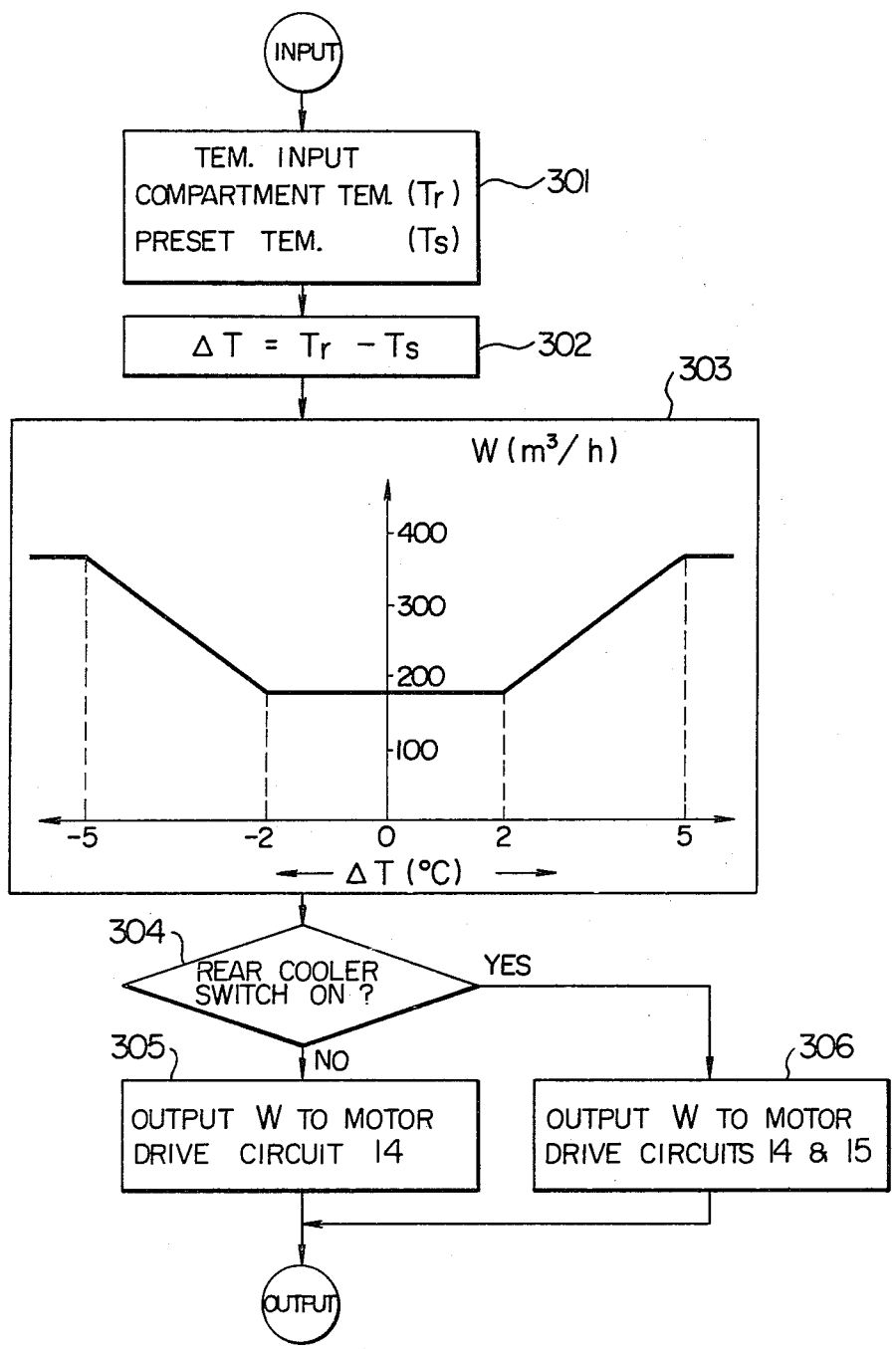
FIG. 6 is a flowchart showing the detailed computing operations of the blower speed controlling operational routine shown in FIG. 5.
Figure 7:
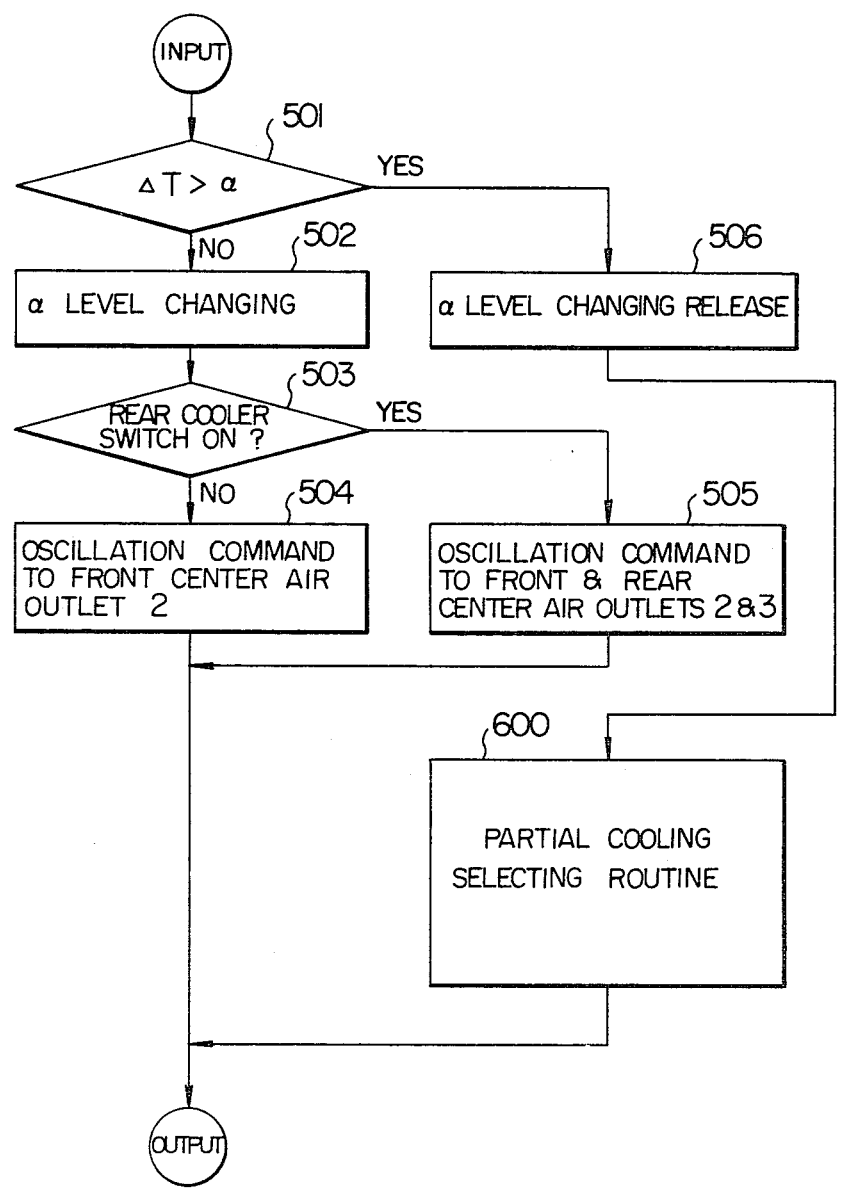
FIG. 7 is a flowchart showing the detailed computing operations of the blowing direction controlling operational routine shown in FIG. 5.
Figure 8:
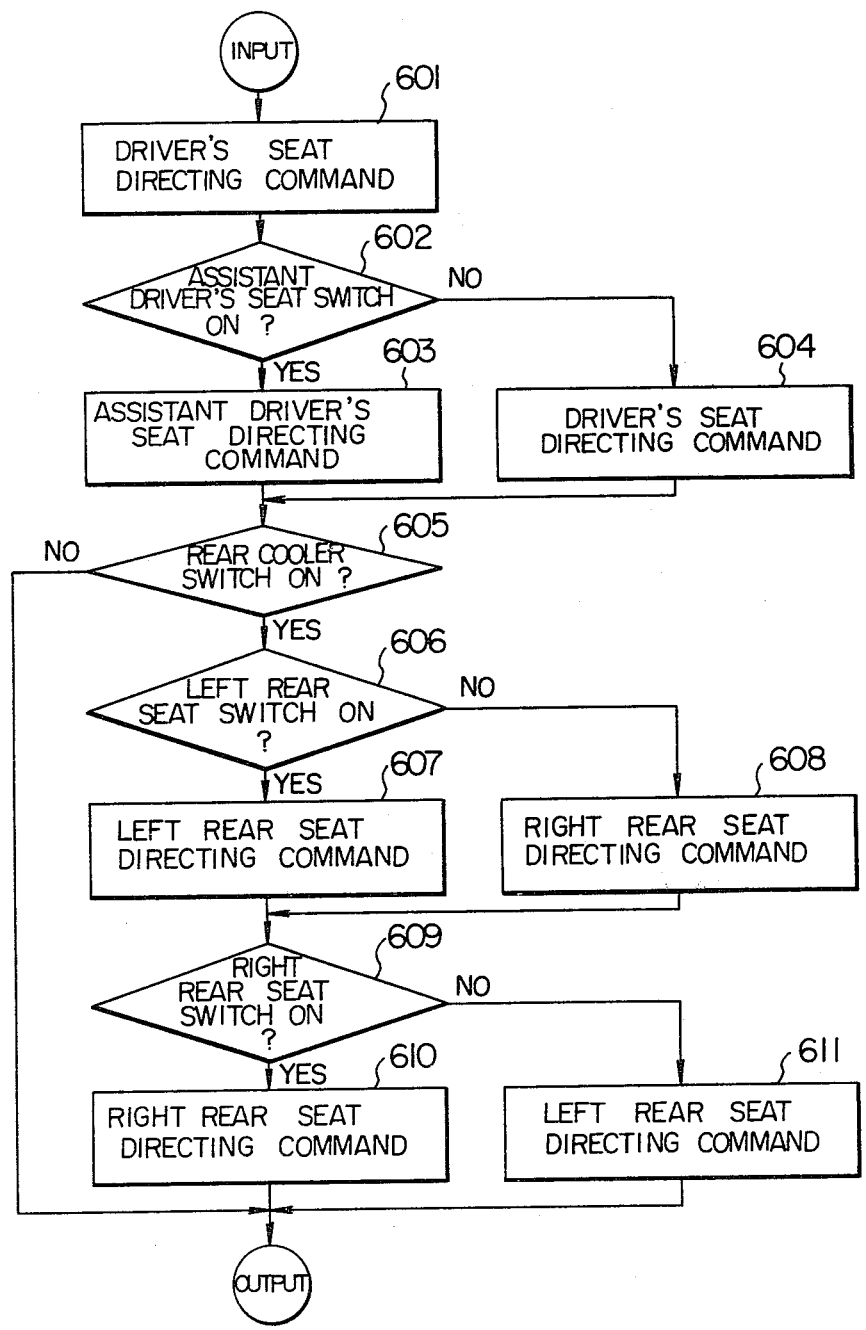
FIG. 8 is a flowchart showing the detailed computing operations of the partial cooling selecting operational routine shown in FIG. 7.

FIG. 5 is a flowchart showing the overall processing operation of the microcomputer 12, FIG. 6 is a flowchart showing the detailed computing operations of the blower speed controlling operational routine shown in FIG. 5, FIG. 7 is a flowchart showing the detailed computing operations of the blowing direction controlling operational routine shown in FIG. 5, and FIG. 8 is a flowchart showing the detailed computing operations of the partial cooling selecting operational routine shown in FIG. 5.

The processing operation of the microcomputer 12 will be described first. When the air conditioner switch (not shown) of the vehicle equipped with the apparatus is closed, the microcomputer 12 is supplied with the stabilized output voltage of the stabilized power supply circuit which is supplied by the vehicle battery through the ignition switch (not shown) and it comes into operation to perform the computational operations of the control program at intervals of about several hundreds msec.

More specifically, the processing is started by a step 100 of FIG. 5 and the control is transferred to an initialization step 200 which sets the registers, counters, latches, etc., of the microcomputer 12 to the initial states required for starting the processing operation and which also sends an initialization signal to each of the circuits controlled by the microcomputer 12 to set the circuits to their initial states. This initialization operation includes the operation of setting a level discriminator value α to its initial value of 1°, for example. After the initialization has been effected, the control is transferred to a blower speed controlling operational routine 300.

The blower speed controlling operational routine 300 is such that in accordance with the compartment temperature signal from the compartment temperature sensor 9 and the preset temperature signal from the temperature setting means 10, the operations are performed so that an air flow corresponding to the difference between the compartment temperature and the preset temperature is determined and the rotational speed of the blower motor 1a as well as the rotational speed of the blower motor 4a (if the rear cooler switch 8 is on) are controlled in accordance with the determined air flow. Then the control is transferred to the next temperature controlling operational routine 400.

In accordance with the difference between the compartment temperature and the preset temperature, the temperature controlling operational routine 400 performs the operations required for adjusting the compartment temperature, such as, those for controlling the angular position of the air mixing damper 1d, the on-off operations of the compressor (not shown) and the selecting operation of the inner/outer air selection damper, and then the control is transferred to a blowing direction controlling operational routine 500.

In accordance with the difference between the compartment temperature and the preset temperature and the states of the signals from the seat switches 5, 6 and 7 and the rear cooler switch 8, the blowing direction controlling operational routine 500 performs the computational operations required for controlling the shifting operation of the flow direction changing plate groups 2a, 2b, 3a and 3b of the front and rear center air outlets 2 and 3, and then the control is transferred to the blower speed control routine 300. Thereafter, the processing of the routines from the blower speed controlling operational routine 300 to the blowing direction controlling operational routine 500 is repeated at intervals of about several hundreds msec.

Next, the detailed computational operations of the blower speed controlling operational routine 300 in the above-mentioned repeated processing will be described with reference to the flowchart of FIG. 6.

The processing of the blower speed controlling operational routine 300 is started by a temperature input step 301 so that the compartment temperature signal from the compartment temperature sensor 9 and the preset signal from the temperature setting means 10 are sequentially converted through the A/D converter 11 and the resulting digital signals are sequentially input, and then the control is transferred to a difference computing step 302. The difference computing step 302 computes the difference ΔT between the compartment temperature Tr and the preset temperature Ts from an equation $\Delta T = Tr - Ts$, and then the control is transferred to an air flow setting step 303. The difference ΔT computed by the difference computing step 302 is stored in a selected location of the RAM in the microcomputer 12. The air flow setting step 303 obtains an air flow W from the difference ΔT in accordance with the illustrated characteristic relationship. This characteristic relationship is preliminarily stored in the ROM of the microcomputer 12 so that the numerical range of the difference ΔT is searched and the coefficient of the linear function corresponding to the numerical range is read out and the air flow W corresponding to the difference ΔT is computed. Then the control is transferred to a rear cooler discrimination step 304 which in turn determines whether the rear cooler signal is being generated from the rear cooler switch 8. If the rear cooler signal is being generated, the determination results in "YES", and if the rear cooler signal is not being generated, the determination results in "NO" and the control is transferred to an output step 305. The output step 305 applies to the motor drive circuit 14 a command signal corresponding to the air flow W computed by the air flow setting step 303 and the processing of the blower speed controlling operational routine 300 is completed.

On the other hand, if the determination of the rear cooler discrimination step 304 results in "YES", the control is transferred to an output step 306 so that a command signal corresponding to the air flow W computed by the air flow setting step 303 is applied to each of the motor drive circuits 14 and 15 and the blower speed controlling operational routine 300 is completed.

Next, the detailed computational operations of the blowing direction controlling operational routine 500 will be described with reference to the flowchart of FIG. 7.

The processing of the blowing direction controlling operational routine 500 is started by a difference determination step 501 which determines whether the difference ΔT computed and stored by the difference computing step 302 of the blower speed controlling operational routine 300 is greater than the previously set level discrimination value α. If ΔT>α, that is, if the temperature of the vehicle compartment is high, the determination results in "YES". If the difference ΔT is not greater than the level discrimination value α, that is, if the compartment is being air-conditioned stably, the determination results in "NO" and the control is transferred to an α level changing step 502. The α level changing step 502 sets the level discrimination value α to 1.5° C. so as to provide the determination of the difference determination step 501 with a hysteresis, and then the control is transferred to a rear cooler discrimination step 503. If the determination of the rear cooler discrimination step 503 results in "NO", the control is transferred to an oscillation command step 504 so that a command signal is applied to the shifting actuators 16 and 17 to cause the flow direction changing plate groups 2a and 2b of the front center air outlet 2 to move in an oscillatory motion, and the processing of the blowing direction controlling operational routine 500 is completed. On the other hand, if the determination of the rear cooler discrimination step 503 results in "YES", the control is transferred to an oscillation command step 505 so that a command signal is applied to each of the shifting actuators 16, 17, 18 and 19 so as to cause the flow direction changing plate groups 2a, 2b, 3a and 3b of the front and rear center air outlets 2 and 3 to move in an oscillatory motion, and the processing of the blowing direction controlling operational routine 500 is completed.

On the other hand, if the determination of the difference determination step 501 results in "YES", the control is transferred to an α level changing release step 506 so that the level discrimination value α is set to 1° C. to provide the determination of the difference determination step 501 with a hysteresis, and then the control is transferred to the partial cooling selecting operational routine 600.

The processing of the partial cooling selecting operational routine 600 is started by a first driver's seat directing command step 601 shown in FIG. 8. The first driver's seat directing command step 601 applies a shift command to the shifting actuator 17 to shift the flow direction changing plate group 2b of the front center air outlet 2 toward the driver's seat, and then the control is transferred to an assistant driver's seat discrimination step 602. The assistant driver's seat discrimination step 602 determines whether a seat signal is being generated from the seat switch 5 provided at the assistant driver's seat. If there is no seat signal, the determination results in "NO". If there is the seat signal, the determination results in "YES" and the control is transferred to an assistant driver's seat directing command step 603. The assistant driver's seat directing command step 603 applies a command signal to the shifting actuator 16 to shift the flow direction changing plate group 2a of the front center air outlet 2 toward the assistant driver's seat, and then the control is transferred to a rear cooler discrimination step 605. On the other hand, if the determination of the assistant driver's seat discrimination step 602 results in "NO", the control is transferred to a second driver's seat directing command step 604 which in turn applies a command signal to the shifting actuator 16 to shift the flow direction changing plate group 2a toward the driver's seat, and then the control is transferred to the rear cooler discrimination step 605. If there is no rear cooler signal from the rear cooler switch 8, the determination of the rear cooler discrimination step 605 results in "NO" and the processing of the partial cooling selecting operational routine 600 is completed. If there is the rear cooler signal, the determination results in "YES" and the control is transferred to a left rear seat discrimination step 606. The left rear seat discrimination step 606 determine whether a seat signal is being generated from the seat switch 6 provided at the left rear seat. If there is no seat signal, the result of the determination becomes "NO". If there is the seat signal, the determination results in "YES" and the control is transferred to a first left rear seat directing command step 607. This directing command step 607 applies a command signal to the shifting actuator 18 to shift the flow direction changing plate group 3a of the rear center air outlet 3 toward the left rear seat, and then the control is transferred to a right rear seat discrimination step 609. If the determination of the left rear seat discrimination step 606 results in "NO", the control is transferred to a first right rear seat directing command step 608 so that a command signal is applied to the shifting actuator 18 to shift the flow direction changing plate group 3a toward the right rear seat, and then the control is transferred to a right rear seat discrimination step 609. The right rear seat discrimination step 609 determines whether a seat signal is being generated from the seat switch 7 provided at the right rear seat so that if there is no seat signal, the result of the determination becomes "NO". If there is the seat signal, the determination results in "YES" and the control is transferred to a second right rear seat directing command step 610. This directing command step 610 applies a command signal to the shifting actuator 19 to shift the flow direction changing plate group 3b of the rear center air outlet 3 toward the right rear seat and the processing of the partial cooling selecting operational routine 600 is completed. On the other hand, if the determination of the right rear seat discrimination step 609 results in "NO", the control is transferred to a second left rear seat directing command step 611 so that a command signal is applied to the shifting actuator 19 to shift the flow direction changing plate group 3b toward the left rear seat, and the processing of the partial cooling selecting operational routine 600 is completed. When the processing of the partial cooling selecting operational routine 600 is completed, the processing of the blowing direction controlling operational routine 500 is also completed.

Next, the overall air-conditioning control operation under various conditions will be described in due sequence.

Firstly, the control operation will be described with reference to the case where the temperature of the compartment is high so that the compartment temperature is higher than the preset temperature by more than 5° C. and the number of the occupants in the vehicle is two. In this condition, if the air conditioner switch is closed upon starting the engine due to the high compartment temperature, the stabilized voltage is applied from the stabilized power supply circuit to the microcomputer 12 thus bringing it into operation. As a result, the processing is started by the start step 100 of FIG. 5 and then the control is transferred to the initialization routine 200 which in turn performs the various initialization operations. Then the control is transferred to the blower speed controlling operational routine 300.

When the blower speed controlling operational routine 300 is started, the temperature input step 301 inputs the compartment temperature Tr and the preset temperature Ts, and then the control is transferred to the difference computing step 302 which is turn computes the difference $\Delta T$. In this case, since the compartment temperature is high, the difference $\Delta T$ has a value which is higher than the preset value by more than 5° C. As a result, the air flow W obtained by the next air flow setting step 303 becomes the maximum of about 370 m$^3$/h. Then the control is transferred to the rear cooler discrimination step 304. Since the number of the occupants is two, if the rear cooler switch 8 is off, the determination results in "NO" so that the control is transferred to the output step 305 and a command signal corresponding to the computed air flow of about 370 m$^3$/h is applied to the motor drive circuit 14, thus completing one cycle of the processing of the blower speed controlling operational routine 300. Thus, the blower motor 1a is operated at a high speed.

Then, the control is transferred to the next temperature controlling operational routine 400 and the processing is performed so that the angle of opening of the air mixing damper 1d is controlled in accordance with the then current difference $\Delta T$ and the compressor is turned on to blow the cooled air, and then the control is transferred to the next blowing direction controlling operational routine 500.

The processing of the blowing direction controlling operational routine 500 is started by the difference determination step 501 of FIG. 7 so that since the difference $\Delta T$ has a value greater than 5° C., the determination results in "YES" and the control is transferred to the partial cooling selecting operational routine 600 through the $\alpha$ level changing release step 506.

As a result, the first driver's seat directing command step 601 of FIG. 8 applies a driver's seat directing command to the shifting actuator 17, and then the control is transferred to the assistant driver's seat discrimination step 602. In this case, since the occupant is sitting in the assistant driver's seat, the determination of the step 602 results in "YES" and then the control is transferred to the assistant driver's seat directing command step 603 which in turn applies an assistant driver's seat directing command to the shifting actuator 16. Then the control is transferred to the rear cooler discrimination step 605 whose determination results in "NO" and one cycle of the processing of the blowing direction controlling operational routine 500 is completed, thus returning the control to the blower speed controlling operational routine 300. Thereafter, the processing of the routines from the blower speed controlling operational routine 300 to the blowing direction controlling operational routine 500 is repeated at intervals of about several hundreds msec so that the flow direction changing plate groups 2b and 2a of the front center air outlet 2 are respectively directed toward the driver's seat and the assistant driver's seat and the blower motor 1a is operated at the maximum speed, thus blowing the maximum amount of the cooled air toward the driver's seat and the assistant driver's seat and thereby performing the partial cooling.

Thereafter, when the compartment temperature is decreased gradually so that the difference between the compartment temperature and the preset temperature becomes smaller than 5° C., the air flow W computed by the air flow setting step 303 of the blower speed controlling operational routine 300 is decreased gradually. Consequently, the amount of the cooled air blown into the compartment is decreased gradually.

When the compartment temperature approaches the preset temperature so that the difference becomes smaller than 1° C., the result of the determination of the difference discrimination step 501 of the blowing direction controlling operational routine 500 changes from "YES" to "NO" so that the control is transferred to the α level changing step 502 and the level discrimination value α is changed from 1° C. to 1.5° C. Then the control is transferred to the rear cooler discrimination step 503 whose determination results in "NO" and the control is transferred to the oscillation command step 504. The oscillation command step 504 applies a command signal to each of the shifting actuators 16 and 17 to cause the flow direction changing plate groups 2a and 2b of the front center air outlet 2 to oscillate and one cycle of the processing of the blowing direction controlling operational routine 500 is completed, thus returning the control to the blower speed controlling operational routine 300. Thereafter, the processing of the routines from the blower speed controlling operational routine 300 to the blowing direction controlling operational routine 500 is repeated at intervals of about several hundreds msec so that the flow direction changing plate groups 2a and 2b of the front center air outlet 2 are oscillated and the entire compartment is air-conditioned.

While, in the above case, the number of the occupants was two and thus the rear cooler was not operated, where the number of the occupants is three or four so that the rear cooler is operated, the flow direction changing plate groups 3a and 3b of the rear center air outlet 3 are controlled in the like manner as the shifting control of the flow direction changing plate groups 2a and 2b of the front center air outlet 2. In other words, when the temperature of the compartment is high, the flow direction changing plate groups 3a and 3b are directed toward the occupants sitting in the rear seats so that after the stable air conditioning of the compartment has been attained, the flow direction changing plate groups 3a and 3b are oscillated and the part of the compartment including the rear seats is entirely air-conditioned.

While, in the above-described embodiment, the shifting means comprises the flow direction changing plate groups 2a, 2b, 3a and 3b of the front and rear center air outlets 2 and 3, it is possible to attain a finer partial cooling effect by providing the front and rear left and right air outlets with the similar flow direction changing plate groups and by shifting these plate groups.

Further, while the flow direction changing plate groups 2a and 2b or the flow direction changing plate groups 2a, 2b, 3a and 3b are oscillated so as to air-condition the entire compartment, the ceiling of the compartment may be provided with a cooled air induction duct and a large number of holes so that the cooled air is blown like a shower into the compartment to air-condition the compartment. In other words, the compartment ceiling may be provided with a cooled air induction duct and a damper as shifting means for selectively connecting the duct with the front and rear center air outlets 2 and 3, whereby the damper is shifted in accordance with the temperature of the compartment.

Further, while, the microcomputer 12 is used as control means, the control means may be of a hard logic construction employing electronic circuitry.

Still further, while, when the difference ΔT between the compartment temperature Tr and the preset temperature Ts becomes smaller than 1° C., it is considered to be an indication that the compartment has changed from its high temperature state to its stably air-conditioned state, this level discrimination value is not intended to be limited to 1° C. For example, the value may be 2° C. or alternatively the value may be varied manually by the occupants. Further, the determination of the stable air-conditioned state on the basis of the difference ΔT may be effected in accordance with the gradient of variation of the difference ΔT. Still further, while the high temperature state of the compartment is determined by detecting the level of the difference ΔT, where the preset value is fixed with respect to the external temperature, it is possible to arrange so that only the level discrimination of the compartment temperature is effected and the discrimination level is compensated for the effect of the external temperature.

Still further, the partial blowing for directing the temperature-adjusted air toward the object occupant or occupants need not to be effected only when the compartment temperature is high and the partial blowing may also be effected when the compartment temperature is low. In other words, when the compartment temperature is lower than the preset temperature by more than a predetermined temperature difference, the heated air may be blown toward the object occupant.

It will thus be seen from the foregoing description that in accordance with the present invention, by virtue of the fact that the blowing of the air-conditioning air into the compartment is changed to the partial blowing when the compartment temperature detected by the compartment temperature sensor is out of the range of stable air-conditioning temperature with respect to the desired temperature for compartment air-conditioning, the blowing of temperature-adjusted air during the transient period in the air-conditioning of the compartment, such as, during change-over between the overall blowing and the partial blowing can be suitably changed through automatic control.

What is claimed is:

1. In an automobile air-conditioning control apparatus including compartment temperature sensor means for sensing the temperature of a vehicle compartment of an automobile, means for supplying temperature-adjusted air into said vehicle compartment to adjust said compartment temperature sensed by said temperature sensor means to a desired temperature for compartment air-conditioning, and shifting means for changing the direction of flow of said temperature-adjusted air blown into said vehicle compartment thereby controlling the air-conditioning of said vehicle compartment, the improvement comprising:

actuating means for actuating said shifting means to effect change-over from a partial blowing operation for blowing said temperature-adjusted air toward at least one selected occupant to an overall blowing operation for blowing said temperature-adjusted air into the entire interior of said vehicle compartment, and vice versa; and control means for controlling said acuating means to change the blowing of said temperature-adjusted air to said partial blowing operation when said compartment temperature sensed by said temperature sensor means is out of a range of stable air-conditioning temperatures.

2. An apparatus according to claim 1, wherein said control means includes a microcomputer including:

a read-only memory (ROM) storing a control program determining the sequence of operations;

a central processing unit (CPU) for sequentially reading said control program from said ROM to perform corresponding computational operations;

a read/write memory (RAM) for temporarily storing various data associated with said computational operations of said CPU in a manner that said data may be read by said CPU;

a clock generator including a quartz crystal unit for generating reference clock pulses required for said computational operations; and input/output (I/O) circuit means for controlling input and output operations of signals.

3. An apparatus according to claim 2, wherein said actuating means includes a plurality of actuator means each thereof including:

a selector circuit for selecting a shifting actuator select signal from said microcomputer to generate a latch signal;

a latch circuit for latching a digital signal representing a shifting signal in synchronism with a clock signal from said microcomputer when said latch signal is generated from said selector circuit;

a logical operation circuit responsive to said digital signal latched by said latch circuit and another digital signal indicative of a position of flow direction changing plate means for generating a control signal to control the position of said flow direction changing plate means;

a pulse generator for generating a pulse train of a predetermined period when said control signal from said logical operation circuit is at a high level;

a motor drive circuit responsive to said pulse train from said pulse generator for generating drive pulses;

a pulse motor responsive to said drive pulses for rotating a rotary shaft of said flow direction changing plate means; and a position sensing board rotatable in response to the rotation of said rotary shaft of said flow direction changing plate means, said position sensing board including a plurality of copper foils arranged thereon and a plurality of contacts respectively associated with said copper foils whereby a high level signal is generated when each of said contacts coincides with corresponding one of said copper foils.

4. An automobile air-conditioning control apparatus comprising:

compartment temperature sensor means for sensing the temperature of a vehicle compartment of an automobile;

temperature setting means or presetting a desired temperature to be controlled;

analog-to-digital converter means for converting each of a compartment temperature indicative signal from said compartment temperature sensor means and a preset temperature indicative signal from said temperature presetting means to a digital signal;

microcomputer means responsive to said digital signals from said analog-to-digital converter means for performing corresponding computational operations;

a plurality of shifting actuator means each responsive to a command signal from said microcomputer means for controlling the position of flow direction changing plate means to effect change-over from a partial blowing operating for blowing said temperature-preset air toward at least one selected occupant to an overall blowing operation for blowing said temperature-preset air into the entire interior of said vehicle compartment, and vice versa; and motor drive circuit means responsive to another command signal from said microcomputer means for generating a control signal to control the rotational speed of blower motor means, said microcomputer means being provided to control said actuator to change the blowing of said temperature-preset air to said partial blowing operating when said compartment temperature sensed by said temperature sensor means is out of a range of stable air-conditioning temperatures.

* * * * *